US010934474B2

(12) United States Patent
Allensworth et al.

(10) Patent No.: US 10,934,474 B2
(45) Date of Patent: Mar. 2, 2021

(54) METHOD TO GENERATE ACIDIC SPECIES IN WELLBORE FLUIDS

(71) Applicant: Baker Hughes, a GE company, LLC, Houston, TX (US)

(72) Inventors: James R. Allensworth, Houston, TX (US); Moctesuma R. Trevino, Houston, TX (US); Marshall Chiasson, Spring, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 188 days.

(21) Appl. No.: 16/130,766

(22) Filed: Sep. 13, 2018

(65) Prior Publication Data

US 2020/0087567 A1 Mar. 19, 2020

(51) Int. Cl.
*C09K 8/528* (2006.01)
*E21B 37/06* (2006.01)

(52) U.S. Cl.
CPC ............. *C09K 8/528* (2013.01); *E21B 37/06* (2013.01)

(58) Field of Classification Search
CPC .............................. C09K 8/528; E21B 37/06
See application file for complete search history.

(56) References Cited

U.S. PATENT DOCUMENTS

| | | | |
|---|---|---|---|
| 4,946,604 A * | 8/1990 | Smith | C09K 8/887 106/162.8 |
| 5,445,223 A | 8/1995 | Nelson et al. | |
| 5,501,276 A * | 3/1996 | Weaver | C09K 8/52 166/291 |
| 6,617,285 B2 | 9/2003 | Crews | |
| 7,776,796 B2 | 8/2010 | Shapovalov et al. | |
| 7,906,464 B2 | 3/2011 | Davidson | |
| 7,992,656 B2 | 8/2011 | Dusterhoft et al. | |
| 8,163,826 B2 | 4/2012 | Willberg et al. | |
| 8,863,838 B2 | 10/2014 | Armstrong et al. | |
| 9,493,697 B2 | 11/2016 | Luyster et al. | |
| 9,650,559 B2 | 5/2017 | Nelson | |
| 2005/0257932 A1 | 11/2005 | Davidson et al. | |
| 2005/0263285 A1 | 12/2005 | Santra et al. | |
| 2006/0229212 A1 | 10/2006 | Willberg et al. | |
| 2007/0169938 A1 | 7/2007 | Moorehead et al. | |
| 2010/0252267 A1 | 10/2010 | Harris et al. | |
| 2013/0037274 A1 * | 2/2013 | Crews | C09K 8/536 166/376 |
| 2014/0113843 A1 | 4/2014 | Shumway et al. | |
| 2014/0303047 A1 | 10/2014 | McDaniel et al. | |
| 2014/0318788 A1 | 10/2014 | Agrawal et al. | |
| 2015/0361328 A1 | 12/2015 | Almutairi et al. | |
| 2016/0130497 A1 | 5/2016 | Liu et al. | |
| 2017/0167211 A1 | 6/2017 | Gamage et al. | |

FOREIGN PATENT DOCUMENTS

| | | |
|---|---|---|
| GB | 2542656 A | 3/2017 |
| WO | 2000057022 | 9/2000 |
| WO | 2004007905 A1 | 1/2004 |
| WO | 2005095538 A1 | 10/2005 |
| WO | 2008038033 A1 | 4/2008 |
| WO | 2017083447 A1 | 5/2017 |
| WO | 2017116438 A1 | 7/2017 |

* cited by examiner

*Primary Examiner* — Alicia Bland

(74) *Attorney, Agent, or Firm* — Mossman, Kumar & Tyler, P.C.

(57) ABSTRACT

Certain sugars, when exposed to high temperatures, undergo oxidation to produce acidic species. Certain sugar alcohols are also acid precursors. The acidification process is a function of temperature, salinity, pH, and/or the presence of an agent, such as an accelerator or a retarder. The rate of acidification may be controlled within a filter cake breaker fluid in order to achieve a predetermined fluid pH after a selectable period of time. The time controllable nature of the acidification allows the development of filter cake breaker fluids with an engineered activity delay.

17 Claims, No Drawings

METHOD TO GENERATE ACIDIC SPECIES IN WELLBORE FLUIDS

TECHNICAL FIELD

The present invention relates to methods for breaking a filter cake on and/or in a wellbore and/or a subterranean formation, and more particularly relates, in one non-limiting embodiment, to methods for controllably breaking a filter cake on and/or in a wellbore and/or a subterranean formation by generating an acidic species.

BACKGROUND

Generally, formation damage involves undesirable alteration of the initial characteristics of a producing formation, typically by exposure to drilling fluids. The water or solid particles in the drilling fluids, or both, tend to decrease the pore volume and effective permeability of the producible formation in the near-wellbore region. There may be at least three possible mechanisms at work. First, solid particles from the drilling fluid may physically plug or bridge across flowpaths in the porous formation, such as in the form of a filter cake. Second, when water contacts certain clay minerals in the formation, the clay typically swells, thus increasing in volume and in turn decreasing the pore volume. Third, chemical reactions between the drilling fluid and the formation rock and fluids may precipitate solids or semisolids that plug pore spaces.

A filter cake is the residue deposited on a permeable medium, such as a wellbore wall of a subterranean formation, when a slurry, such as a drilling fluid, is forced against the medium under pressure. Filtrate is the liquid that passes through the medium, leaving the filter cake on the medium. Drilling muds are tested to determine filtration rate and filter-cake properties. Cake properties such as cake thickness, toughness, slickness and permeability are important because the cake that forms on permeable zones in the wellbore can cause stuck pipe and other drilling problems. Reduced oil and gas production may result from reservoir damage when a poor filter cake allows deep filtrate invasion into the formation. A certain degree of cake buildup is desirable to isolate formations from drilling fluids. In openhole completions in high-angle or horizontal holes, the formation of an external filter cake is preferable to a cake that forms partly inside the formation. The latter has a higher potential for formation damage. It may thus be seen that filter cake may form within a wellbore, on a wellbore wall, as well as on and/or within a subterranean formation.

Reduced hydrocarbon production can result from reservoir damage when a drilling mud deeply invades the subterranean reservoir. It will also be understood that the drilling fluid, e.g. oil-based mud, is deposited and concentrated at the borehole face and partially inside the formation. Many operators are interested in improving formation clean up and removing the filter cake and thus removing or improving formation damage after drilling into reservoirs with drilling fluids, such as oil-based muds (OBMs).

It would be desirable if compositions and methods could be devised to aid and improve the removal of filter cake, often called "breaking" the filter cake so that it may be removed. While it is known to remove filter cake by using an acidic fluid, it is desirable to control or engineer the timing of filter cake breaking with more precision.

SUMMARY

There is provided, in one non-limiting form, a method for breaking a filter cake on and/or in a wellbore and/or a subterranean formation, where the method includes introducing a breaker fluid into contact with the filter cake on and/or in a wellbore and/or a subterranean formation. The breaker fluid includes brine and an acid precursor. The acid precursor includes, but is not necessarily limited to, at least one sugar and/or at least one sugar alcohol. Suitable sugars include, but are not necessarily limited to, glyceraldehyde, fructose, glucose, galactose, sucrose, trehalose, lactose, maltose, and combinations thereof. Suitable sugar alcohols include, but are not necessarily limited to, glycerol, erythritol, sorbitol, mannitol, and combinations thereof. The method further includes oxidizing the acid precursor to produce at least one acid to give a fluid pH below a threshold effective to break the filter cake, where the rate of acidification is controlled by a method including, but not necessarily limited to, a change in temperature, a change in salinity, the presence of an agent including at least one initiator and at least one retarder, an initial breaker fluid pH, or combinations thereof. Finally the method includes at least partially breaking the filter cake via the acid.

DETAILED DESCRIPTION

It has been discovered that certain sugars, carbohydrates, and sugar alcohols, when dissolved in water, will undergo hydrolysis or oxidation when exposed to elevated temperatures for extended periods of time. When this process occurs, acidic products are generated. The rate at which the acidic species are generated has been discovered to be dependent on the temperature, salinity, and presence of an agent, such as an initiator or a retarder. A breaker fluid containing brine, sugar, and initiator/retarder can be formulated to have a near neutral pH, defined herein as about 7. When exposed to high temperatures comparable to reservoir conditions, the sugar or sugar alcohol hydrolysis and oxidation will occur, causing a reduction in pH. If properly designed, the pH of the breaker fluid will reach the optimum conditions for other fluid components like enzymes or surfactants after a desired period of time. The desired time to reach the optimum pH varies depending on the initial components of the fluid and the temperature that the breaker fluid is exposed to. Factors that promote the acidification process include, but are not necessarily limited to, elevated temperatures, and lower initial pH. Factors that delay the acidification process include, but are not necessarily limited to, lower temperatures, higher initial pH, stabilizing agent and presence of buffering agents. Initial tests show salinity to have a slight promoting effect to the acidification process.

In more detail, the breaker fluid has at least two components, a brine that serves as a carrier fluid and an acid precursor that is oxidized or hydrolyzed to produce or form at least one acid to give a fluid pH below a threshold that is effective to break the filter cake. In one non-limiting embodiment, the target pH threshold effective to break the filter cake ranges from about 1 independently to about 6, alternatively from about 2 independently to about 4. The use of the term "independently" herein with respect to a range means that any range endpoint may be used together with any other range endpoint to give a suitable alternate range. Non-limiting examples in this particular instance are from about 1 to about 4, or alternatively from about 1 to about 2.

The brine carrier fluid may be halide or formate brine. For halide brines, the initial pH range may be from about 4 independently to about 8, alternatively from about 4 independently to about 7. For formate brines, the initial pH range may be from about 5 independently to about 10, alternatively from about 4 independently to about 7.

It will be appreciated that pH may be increased or decreased using conventional chemicals, whereas pH may commonly be lowered by the addition of acids including, but not necessarily limited to, mineral acids and organic acids, specific suitable examples of which may be, but are not restricted to, hydrochloric acid, sulfuric acid, formic acid phosphoric acid, nitric acid, phosphoric acid, hydrofluoric acid, hydrobromic acid, boric acid, fluoroboric acid, acetic acid, glycolic acid, dicarboxylic acid, tricarboxylic acids, aminocarboxylic acids, sulfonic acids, chloracetic acid, hydroxyacetic acid, succinic acid, glutaric acid, adipic acid, and mixtures thereof. Suitable bases include, but are not necessarily limited to, sodium hydroxide, potassium hydroxide, lime, magnesium oxide, and mixtures thereof.

With respect to the acid precursors, suitable sugars include, but are not necessarily limited to, glyceraldehyde, fructose, glucose, galactose, sucrose, trehalose, lactose, maltose, and combinations thereof. It will be appreciated that mention of these sugars herein also includes and encompasses syrups of these sugars or other concentrations thereof. Suitable sugar alcohols include, but are not necessarily limited to, glycerol, erythritol, sorbitol, mannitol, and combinations thereof. These sugars and sugar alcohols, when dissolved in water, will undergo hydrolysis or oxidation when exposed to elevated temperatures for extended periods of time. When these processes occur, acidic products are generated. The acidic products include, but are not necessarily limited to aldonic, ulosonic, uronic, aldaric, or adipic acids. The acid precursor may include only one sugar or only one sugar alcohol, or one of each, or a plurality of sugars and/or sugar alcohols.

Acid precursor concentration is a factor both in the rate of acid production and the total amount of acid generated. For the sugars, the concentration range may be from about 0.1 wt % independently to about 20 wt %, alternatively from about 0.1 wt % independently to about 5 wt %. For the sugar alcohols, the concentration range may be from about 0.1 wt % independently to about 70 wt %, alternatively from about 0.1 wt % independently to about 5 wt %; in a different non-limiting embodiment from about 0.1 wt % to about 35 wt %.

As noted, it has been discovered that the rate of acidification within the filter cake breaker fluid can be controlled or modified to achieve a predetermined fluid pH after a selectable period of time. The time controllable nature of the acidification allows the development of filter cake breaker fluids with an engineered activity delay which can be important when designing or determining when a filter cake will be broken.

As noted, factors that promote or accelerate the rate of acidification include, but are not necessarily limited to, increasing the temperature of the breaker fluid, providing a relatively low initial breaker fluid pH, increasing the salinity, introducing at least one initiator into the breaker fluid, and combinations of these techniques or steps. With respect to providing a relatively low initial breaker fluid pH, in one non-limiting embodiment, when the brine is a halide brine, the initial pH may be from about 4 independently to a pH of about 8; alternatively from about 4 independently to about 7. When the brine is a formate brine, the initial pH may be from about 5 independently to a pH of about 10; alternatively from about 4 independently to about 7. In another non-restrictive version, the target pH should be at least 2 pH units below the initial pH, alternatively at least 4 pH units lower, and in another one non-limiting embodiment at least 8 pH units lower.

The temperature differential from initial temperature to final temperature should be at least 100° F. (37.8° C.), alternatively at least 150° F. (65.6° C.), and in another non-limiting embodiment at least 300° F. (14.8° C.). In one non-limiting embodiment, by way of example, the breaker fluid at the surface may be between 40° F. (4.4° C.) and 90° F. (32° C.), and once downhole, the formation can increase the temperature of the breaker fluid to the bottom hole temperature, which may be from 150° F. (65.6° C.) to more than 350° F. (177° C.).

Increasing the salinity has been found to slightly promote the rate of acidification. To qualify as a salinity increase, the salinity should increase at least 1%, alternatively at least 5%, and in another non-limiting embodiment at least 20%.

Suitable initiators or accelerators to promote the rate of acidification to be introduced into the breaker fluid include, but are not necessarily limited to, organic salts. Suitable specific organic salts include, but are not necessarily limited to, phosphinates, urates, or oxalates. The initiator is present in the breaker fluid in a concentration of about 0.1 wt % independently to about 10 wt %; alternatively from about 0.1 wt % independently to about 1.0 wt %.

In some different cases it will be useful to engineer or design a delay in the acidification and subsequent filter cake breaking or dissolution. This would be useful if the system would ordinarily break the filter cake undesirably fast, as too soon before another step. Controlling the rate of acidification by delaying it may be done by lowering the temperature of the breaker fluid, providing a relatively high initial breaker fluid pH, and/or introducing at least one retarder into the breaker fluid.

Where delaying the rate of acidification by the technique of starting at a relatively high initial pH, the initial pH may be at least about 10, alternatively at least about 8, and in another non-limiting embodiment at least about 7. As noted, the final pH threshold ranges between about 1 and about 6. The difference between the relatively low initial pH and the pH threshold should be at least 2 pH units, or differently at least 3 pH units, alternatively at least 5 pH units, and in another non-limiting embodiment, at least 7 pH units.

In the case of controlling the rate of acidification by delaying the rate of acidification through introducing at least one retarder, suitable retarders include, but are not necessarily limited to, pH buffering compounds, oxidizing agents, or combinations thereof. Specific suitable pH buffering compounds include, but are not necessarily limited to, bicarbonates, mono sodium phosphate, and disodium phosphate, [tris(hydroxymethyl)methylamino]propanesulfonic acid (TAPS), tris cacodylate, and the like. Specific suitable oxidizing agents include, but are not necessarily limited to, peroxides, perborates, persulfates, and the like. In one non-limiting embodiment the amount of retarder introduced, as a basis of the breaker fluid, may be about 0.1 wt % independently to about 10 wt %, alternatively about 0.1 wt % independently to about 1.0 wt %.

It is unlikely that an accelerator (promoter or initiator) and a retarder would be used together in the same breaker fluid.

It should be emphasized that in the present method the acidification occurs downhole. Stated in a different way, oxidizing or hydrolyzing the acid precursor to produce at least one acid does not occur prior to the breaker fluid being introduced to be in contact with the filter cake, or at least does not appreciably oxidize or hydrolyze the acid precursor. That is, the oxidizing or hydrolyzing the acid precursor occurs in situ. Further, the method is conducted in the absence of sugar acid esters. It should also be appreciated that all of the acid precursor need not be oxidized or hydrolyzed for the method to be considered successful. All that is necessary is for the filter cake to be acceptably broken. In other words, it is not necessary, and as a practical matter may be impossible, to completely break or remove all of the filter cake. So far as the majority (at least 50 wt %) of the filter cake is broken, the method can be considered a success.

Types of filter cake for which the methods and compositions described herein are suitable include, but are not necessarily limited to, primarily calcium carbonate but also potassium carbonate, sodium carbonate, or lithium carbonate, and combinations of these. The invention will now be described with respect to certain Examples which are not intended to limit the invention in any way, but rather to further illuminate it with respect to certain non-limiting embodiments.

EXAMPLE 1

Several scoping tests were performed to study the acidification process, and to what extent the acidic products are generated. In the first test, sugar (fructose) syrup was mixed with fresh water or sodium chloride brine, and aged at 180° F. (82° C.) for 64 hours. Control solutions of brine and water were also aged. After the heat treatment, the pH of fresh water and sodium chloride brine controls were 6.8 and 6.1, respectively. After the same heat treatment, the pH values of the 5% by weight solutions of sugar syrup in fresh water or sodium chloride brine were 5.0 and 4.3, respectively.

EXAMPLE 2

In another test, a sugar alcohol (sorbitol) mixed at 8 wt % in a calcium bromide brine had an initial pH of 6. After 48 hours at 350° F. (177° C.), the final pH was 1.1. A small quantity of calcium carbonate was added to this solution. Effervescence was noted, indicating the dissolution of the calcium carbonate to produce carbon dioxide gas. This test showed the ability of the acidic species to acidize calcium carbonate, which would be present in filter cakes downhole.

In the foregoing specification, the invention has been described with reference to specific embodiments thereof, and has been suggested as effective in providing effective methods and compositions for providing braking fluids and methods for breaking filter cakes on and/or in wellbores and/or subterranean formations. However, it will be evident that various modifications and changes may be made thereto without departing from the broader scope of the invention. Accordingly, the specification is to be regarded in an illustrative rather than a restrictive sense. For example, specific combinations of components for forming the breaking fluids, such as sugars, sugar alcohols, salts, agents, initiators, promoters, accelerators, retarders, materials to increase or decrease pH, filter cakes, other additives and proportions thereof falling within the claimed parameters, and conditions including, but not necessarily limited to, salinity, temperature, pH, but not specifically identified or tried in a particular fluid to improve the lubricity as described herein, are anticipated to be within the scope of this invention. Furthermore, parameters other than those specifically discussed herein, notably filter cake breaking, may also be improved.

The present invention may suitably comprise, consist or consist essentially of the elements disclosed and may be practiced in the absence of an element not disclosed. For example, in a method for breaking a filter cake on and/or in a wellbore and/or a subterranean formation, the method may comprise, consist essentially of, or consist of introducing a breaker fluid into contact with the filter cake on and/or in a wellbore and/or a subterranean formation, where the breaker fluid comprises, consists essentially of, or consists of brine and at least one acid precursor selected from the group consisting of at least one sugar selected from the group consisting of glyceraldehyde, fructose, glucose, galactose, sucrose, trehalose, lactose, maltose, and combinations thereof and/or at least one sugar alcohol selected from the group consisting of glycerol, erythritol, sorbitol, mannitol, and combinations thereof. The method may further comprise, consist essentially of, or consist of oxidizing or hydrolyzing the acid precursor to produce at least one acid to result in a fluid pH below a threshold effective to break the filter cake, where the rate of acidification is controlled by a method selected from the group consisting of a change in temperature; a change in salinity; the presence of an agent selected from the group consisting of at least one initiator and at least one retarder; an initial breaker fluid pH; and combinations thereof. The method further comprises, consists essentially of, or consists of at least partially breaking the filter cake by the acid.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for breaking a filter cake in a wellbore and/or a subterranean formation, the method comprising:

introducing a breaker fluid into contact with the filter cake in a wellbore and/or a subterranean formation, where the breaker fluid comprises:
brine, and
at least one acid precursor selected from the group consisting of:
at least one sugar selected from the group consisting of glyceraldehyde, fructose, glucose, galactose, sucrose, trehalose, lactose, maltose, and combinations thereof; and
at least one sugar alcohol selected from the group consisting of glycerol, erythritol, sorbitol, mannitol, and combinations thereof; and
oxidizing or hydrolyzing the acid precursor to produce at least one acid to result in a fluid pH below a threshold effective to break the filter cake, where the rate of acidification is controlled by a method selected from the group consisting of:
a change in temperature;
a change in salinity;
the presence of an agent selected from the group consisting of at least one initiator and at least one retarder;
an initial breaker fluid pH; and
combinations thereof; and
at least partially breaking the filter cake by the acid.

2. The method of claim 1 where the pH threshold ranges between about 1 and about 6.

3. The method of claim 1 where:
when the acid precursor is at least one sugar the concentration of the at least one sugar in the breaker fluid ranges from about 0.1 wt % to about 20 wt %; and
when the acid precursor is at least one sugar alcohol the concentration of the at least one sugar alcohol in the breaker fluid ranges from about 0.1 wt % to about 70 wt %.

4. The method of claim 1 where the brine is selected from the group consisting of halide brines and formate brines, and
when the brines are halide brines, the pH ranges from about 4 to about 8; and
when the brines are formate brines, the pH ranges from about 5 to about 10.

5. The method of claim 1 where controlling the rate of acidification is promoting the rate of acidification and the promoting the rate of acidification is selected from the group consisting of:
increasing the temperature of the breaker fluid;
providing a relatively low initial breaker fluid pH;
increasing the salinity;
introducing at least one initiator into the breaker fluid;
introducing at least one retarder into the breaker fluid; and
combinations thereof.

6. The method of claim 5 where:
controlling the rate of acidification comprises providing a relatively low initial pH;
the pH threshold ranges between about 1 and about 6; and
the difference between the relatively low initial pH and the pH threshold is at least 2 pH units.

7. The method of claim 5 where promoting the rate of acidification comprises introducing at least one accelerator or retarder into the breaker fluid, where the at least one accelerator or retarder is at least one organic salt.

8. The method of claim 7 where the accelerator or retarder is present in the breaker fluid in a concentration of about 0.1 wt % to about 10 wt %.

9. The method of claim 1 where controlling the rate of acidification is delaying the rate of acidification and the delaying the rate of acidification is selected from the group consisting of:
lowering the temperature of the breaker fluid;
providing a relatively high initial breaker fluid pH;
introducing at least one retarder into the breaker fluid; and
combinations thereof.

10. The method of claim 9 where:
controlling the rate of acidification comprising providing a relatively high initial pH of at least 8;
the pH threshold ranges between about 1 and about 6; and
the difference between the relatively low initial pH and the pH threshold is at least 2 pH units.

11. The method of claim 9 where controlling the rate of acidification is delaying the rate of acidification by introducing at least one retarder selected from the group consisting of pH buffering compounds, oxidizing agents, or combinations thereof.

12. The method of claim 11 where the retarder is present in the breaker fluid in a concentration of about 0.1 wt % to about 10 wt %.

13. A method for breaking a filter cake on in a wellbore and/or a subterranean formation, the method comprising:
introducing a breaker fluid into contact with the filter cake in a wellbore and/or a subterranean formation, where the breaker fluid comprises:
brine, and
an acid precursor selected from the group consisting of:
at least one sugar selected from the group consisting of glyceraldehyde, fructose, glucose, galactose, sucrose, trehalose, lactose, maltose, and combinations thereof, where the at least one sugar is present in a concentration from about 0.1 wt % to about 20 wt %; and
at least one sugar alcohol selected from the group consisting of glycerol, erythritol, sorbitol, mannitol, and combinations thereof, where the at least one sugar alcohol is present in a concentration from about 0.1 wt % to about 70 wt %; and
oxidizing or hydrolyzing the acid precursor to produce at least one acid to result in a fluid pH below a threshold between about 1 and about 6 to break the filter cake, where the rate of acidification is controlled by a method selected from the group consisting of:
a change in temperature;
a change in salinity;
the presence of an agent selected from the group consisting of at least one accelerator and at least one retarder;
an initial breaker fluid pH; and
combinations thereof; and
at least partially breaking the filter cake by the acid.

14. The method of claim 13 where controlling the rate of acidification is promoting the rate of acidification and the promoting the rate of acidification is selected from the group consisting of:
increasing the temperature of the breaker fluid;
providing a relatively low initial breaker fluid pH of:
when the brine is a halide brine, from a pH of about 4 to a pH of about 8; and
when the brine is a formate brine, from a pH of about 5 to a pH of about 10;
increasing the salinity;
introducing at least one initiator into the breaker fluid; and
combinations thereof.

15. The method of claim 13 where controlling the rate of acidification is delaying the rate of acidification and the delaying the rate of acidification is selected from the group consisting of:
  lowering the temperature of the breaker fluid;
  providing a relatively high initial breaker fluid pH;
  introducing at least one retarder into the breaker fluid; and
  combinations thereof.

16. A method for breaking a filter cake in a wellbore and/or a subterranean formation, the method comprising:
  introducing a breaker fluid into contact with the filter cake in a wellbore and/or a subterranean formation, where the breaker fluid comprises:
    brine selected from the group consisting of halide brines and formate brines, and
    an acid precursor selected from the group consisting of:
      at least one sugar selected from the group consisting of glyceraldehyde, fructose, glucose, galactose, sucrose, trehalose, lactose, maltose, and combinations thereof, where the at least one sugar is present in a concentration from about 0.1 wt % to about 20 wt %; and
      at least one sugar alcohol selected from the group consisting of glycerol, erythritol, sorbitol, mannitol, and combinations thereof, where the at least one sugar alcohol is present in a concentration from about 0.1 wt % to about 70 wt %; and
  oxidizing or hydrolyzing the acid precursor to produce at least one acid to result in a fluid pH below a threshold between about 1 and about 6 to break the filter cake, where the rate of acidification is delayed by a method selected from the group consisting of:
    lowering the temperature of the breaker fluid;
    providing a relatively high initial breaker fluid pH;
    introducing at least one retarder into the breaker fluid; and
    combinations thereof; and
  at least partially breaking the filter cake by the acid.

17. The method of claim 16 where controlling the rate of acidification is delaying the rate of acidification by introducing at least one retarder selected from the group consisting of pH buffering compounds, oxidizing agents, or combinations thereof, where the retarder is present in the breaker fluid in a concentration of about 0.1 wt % to about 10 wt %.

* * * * *